United States Patent [19]

Hatcher

[11] 4,159,465

[45] Jun. 26, 1979

[54] VEHICLE TIRE PRESSURE MONITOR

[76] Inventor: Creel W. Hatcher, 115 ½ S. Whitaker, Pryor, Okla. 74361

[21] Appl. No.: 941,248

[22] Filed: Sep. 11, 1978

[51] Int. Cl.² .............................................. B60C 23/04
[52] U.S. Cl. ..................................... 340/58; 200/61.25
[58] Field of Search ............. 340/58; 200/61.22, 61.25

[56] References Cited
U.S. PATENT DOCUMENTS

| 3,117,195 | 1/1964 | Woodfill et al. | 340/58 |
| 3,508,193 | 4/1970 | Giovannelli et al. | 340/58 |
| 3,760,350 | 9/1973 | Johnson | 340/58 |

Primary Examiner—Alvin H. Waring
Attorney, Agent, or Firm—Dunlap, Codding & McCarthy

[57] ABSTRACT

A tire pressure monitor wherein a drop in the air pressure within the tire of a vehicle wheel is utilized to complete an electrical circuit including a signal lamp. The pressure in the tire fluidly communicates with a bellows mounted on the wheel and having a fixed end and a free end such that the tire pressure provides an expansive force on the free end of the bellows. A compressed helical spring bears against the free end of the bellows to provide a compressive force on the free end of the bellows so that the bellows is compressed when the tire pressure drops. The free end of the bellows is mechanically linked to a flexible strip which is supported, but not clamped, at two positions disposed about the linkage to the bellows so that the strip is flexed by a compression of the bellows. An extension of the strip is pivoted against a slip ring via the flexing to complete the electrical circuit.

12 Claims, 5 Drawing Figures

VEHICLE TIRE PRESSURE MONITOR

BACKGROUND OF THE INVENTION

1. Field of the Invention

This invention relates generally to tire pressure monitors for vehicles and, more particularly, but not by way of limitation, to tire pressure monitors utilized for signalling a loss of pressure in the tire of a road vehicle.

2. Description of the Prior Art

It is known to provide the wheels of vehicles with tire pressure monitors which detect losses of air pressure in pneumatic tires of such wheels. Examples include the pressure indicator disclosed in U.S. Pat. No. 3,117,195, issued Jan. 7, 1946 to J. L. Woodfill, et al.; the tire pressure warning device disclosed in U.S. Pat. No. 3,588,815, issued June 28, 1971 to Koonce; and the electric pressure device disclosed in U.S. Pat. No. 2,510,785, issued June 6, 1950 to Potts, et al. In general, such devices comprise a pressure transducer mounted on each wheel for detecting a loss in pressure in the pneumatic tire forming a portion of the wheel and a means for transmitting a signal to the passenger compartment of the vehicle in response to the actuation of the pressure transducer in a preselected manner. For example, the indicator disclosed by Woodfill, et al. includes a pressure transducer comprising a cylinder and piston wherein the piston is connected to a lever having an electrical brush disposed thereon. When the pressure in the tire decreases, the lever is pivoted such that the brush contacts a slip ring disposed about the axis of rotation of the wheel.

While the advantages of providing a tire with a pressure monitor are well known, there have been problems in constructing such monitors. The monitor can be complex, and therefore expensive, and the use of the monitor can result in leakage of air from the tire. For example, where a cylinder and piston arrangement are used in the pressure transducer, care must be taken in providing a seal between the piston and cylinder to avoid leakage while still providing sufficient ease of relative movement between the piston and the cylinder such that a small decrease in pressure will result in actuation of the transducer.

It is also important that the pressure transducer be compact such that the transducer can be easily mounted in an out-of-the-way location on the wheel.

SUMMARY OF THE INVENTION

The present invention contemplates a tire pressure monitor wherein the pressure transducer comprises a sealed bellows, having a fixed end and a free end, wherein the pressure of air in the tire coacts with a spring bearing against the free end of the bellows to position the free end. Thus, the pressure transducer is sealed to prevent a loss of tire pressure via the transducer. A flexure strip supported, but not clamped, near the ends thereof is connected to the free end of the bellows such that a loss of pressure, repositioning the free end of the bellows, flexes the strip. A contact strip, connected to one end of the flexure strip, is pivoted via the flexing of the flexure strip to engage a slip ring mounted on a non-rotating portion of the vehicle. The use of a bellows and the flexure strip provides a simple construction for the tire pressure monitor to result in good sealing of the transducer against leakage while permitting the tire pressure monitor to be manufactured at a low cost.

The seal for the free end of the bellows is cup shaped and is disposed within the bellows permitting the major portion of the biasing spring, against which tire pressure acts, to similarly be disposed within the bellows such that the tire pressure monitor is compact. Thus, the tire pressure monitor of the present invention can be mounted within the brake drum of a vehicle to protect the monitor from debris, such as rocks and the like, thrown from the road by the wheels of the vehicle.

An object of the present invention is to provide an inexpensively manufactured tire pressure monitor for a vehicle having wheels including pneumatic tires.

Another object of the invention is to provide a tire pressure monitor which combines low expense of manufacture with elimination of leakage of air from the monitored tire.

Yet a further object of the invention is to provide a compact tire pressure monitor which can be mounted in a protected, out-of-the-way location on the vehicle.

Other objects and advantages of the invention will be evident from the following detailed description when read in conjunction with the accompanying drawings which illustrate a preferred embodiment of the invention.

DESCRIPTION OF THE TIRE PRESSURE MONITOR

Figure 1:
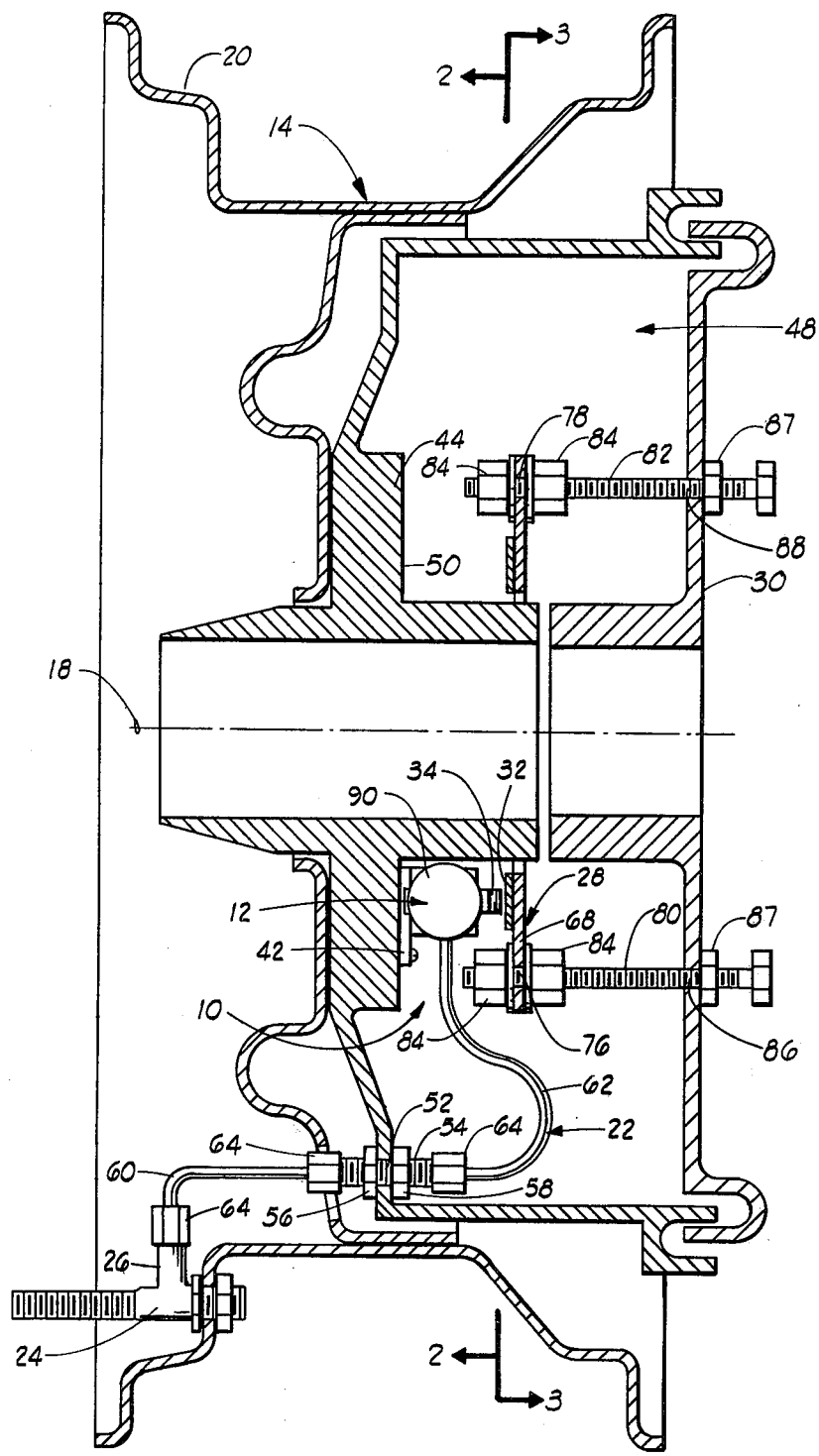
FIG. 1 is a cross section in side elevation of a portion of a vehicle wheel illustrating a preferred manner for mounting the tire pressure monitor on the wheel.
Figure 2:
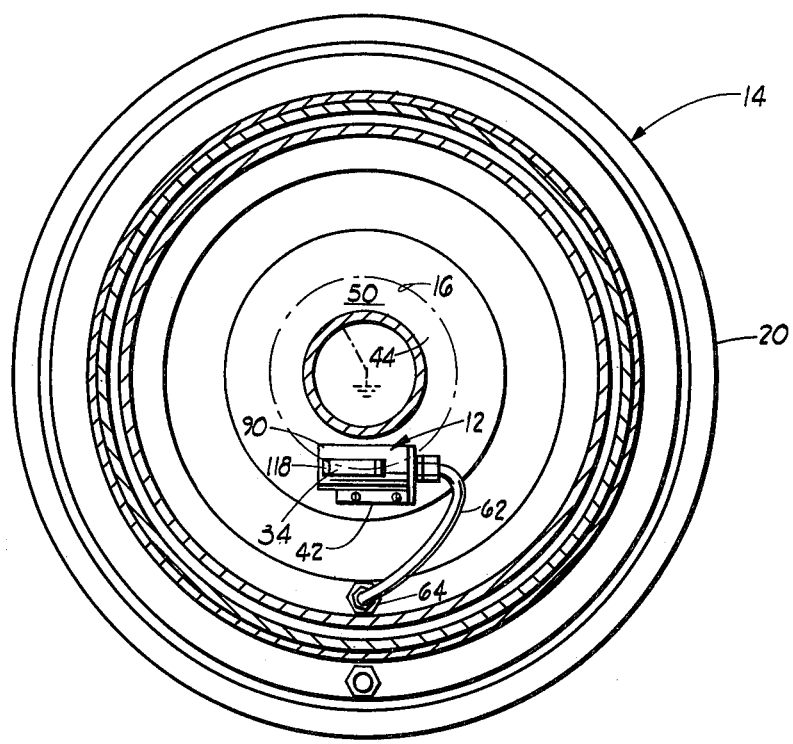
FIG. 2 is a view taken along line 2—2 of FIG. 1.
Figure 3:
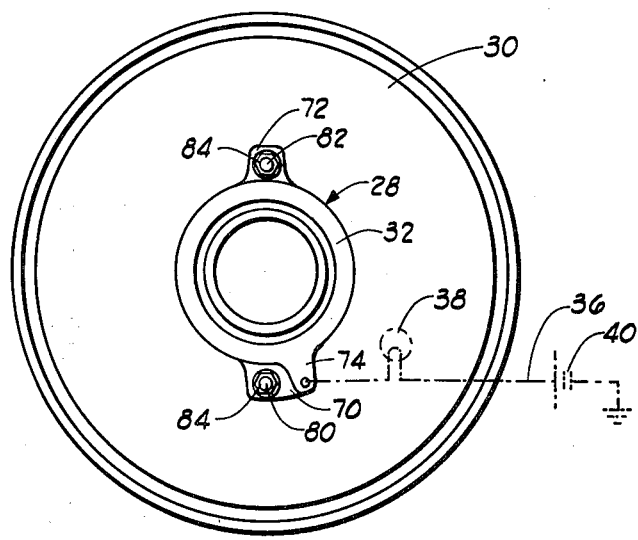
FIG. 3 is a view taken along line 3—3 of FIG. 1.

Referring now to the drawings in general and to FIGS. 1, 2 and 3 in particular, shown therein and designated by the general reference numeral 10 is a tire pressure monitor constructed in accordance with the present invention. In general, the tire pressure monitor 10 comprises a contact assembly 12, mounted on the wheel 14 of a vehicle for movement along a circular travel path 16 as the wheel 14 rotates about the axis 18 of the wheel 14. The wheel 14 includes a rim 20 and a pneumatic tire (not shown) mounted on the rim 20. The tire pressure monitor 10 is constructed to provide a signal to the operator of the vehicle when the pressure in the tire falls to a preselected value.

The tire pressure monitor 10 further comprises a conduit assembly 22 which is mounted on the wheel 14 and which is connected between the contact assembly 12 and the valve stem 24 of the tire to transmit air pressure in the tire to the contact assembly 12. In applications wherein the tire is of the tubeless type such that the valve stem 24 is mounted on the rim 20, the valve stem 24 can be provided with a lateral extension 26 which mates with the conduit assembly 22 and provides communication between the interior of the tire and the conduit assembly 22. In applications wherein the tire contains a tube having an integrally formed valve stem, the conduit assembly 22 can be connected to the valve stem of the tube in any convenient manner.

The tire pressure monitor 10 further comprises a slip ring assembly 28 which is mounted on a non-rotating portion 30 of the vehicle and which is disposed near the wheel 14 of the vehicle. The slip ring assembly 28 comprises a slip ring 32 and the slip ring assembly 28 is positioned on the portion 30 of the vehicle such that the slip ring 32 extends circumferentially about the axis 18 of the wheel 14. In a preferred form of the tire pressure monitor, the slip ring 32 is an electrically conducting, lamellar annulus and the slip ring 32 is disposed in a facing relation with the plane of the circular travel path 16. The contact assembly 12 comprises a contact member 34 and, as will be described below, the contact assembly 12 is constructed such that the contact member 34 is pivoted with respect to the wheel 14 in proportion to the tire air pressure communicated to the contact assembly 12 via the conduit assembly 22. In particular, the contact assembly 12 is positioned on the wheel 14 such that the contact member 34 is pivoted toward the slip ring 32 as the pressure in the tire decreases so that, in the event the pressure in the tire decreases to a preselected value, the contact member 34 will engage the slip ring 32 as has been illustrated in FIG. 5.

The tire pressure monitor 10 further comprises a signal assembly 36, indicated in phantom lines in FIGS. 2 and 3. In one preferred embodiment, the signal assembly 36 comprises a lamp 38 having one electrical terminal connected to the slip ring 32 and having the other electrical terminal connected to one pole of a battery 40. (In the event the vehicle upon which the wheel 14 is mounted has a battery, the battery 40 can be the vehicle battery). The other pole of the battery 40 is connected to a system ground and the wheel 14 is grounded via the axle (not shown) upon which the wheel is mounted. The contact member 34 is constructed of a conducting material and is electrically connected to the wheel 14 such that the contact member 34 grounds the slip ring 32 to complete an electrical circuit through the lamp 38 when the contact member engages the slip ring 32. In the preferred embodiment, the contact assembly 12 is similarly constructed of electrically conducting materials and is mounted on the wheel 14 via a metal bracket 42 such that the contact member 34 is electrically connected to the wheel 14 via other portions of the contact assembly 12 and via the bracket 42.

The tire pressure monitor 10 is particularly adaptable for use in monitoring the air pressure in a tire of a road vehicle such as, for example, an automobile or the like. FIGS. 1, 2 and 3 illustrate a convenient manner for mounting the tire pressure monitor 10 on such a vehicle. Where, as is contemplated in FIGS. 1, 2 and 3, the wheel 14 comprises a brake drum 44, supporting the rim 20, and the vehicle is provided with a backing plate 50 coacting with the brake drum to form a brake shoe chamber 48, it is convenient to mount the contact assembly 12 on an interior annular face 50 of the brake drum 44 and to mount the slip ring assembly 28 on the backing plate as has been illustrated in FIGS. 1, 2 and 3. Thus, the contact assembly 12 and the slip ring 32 are placed in an out-of-the-way location wherein the contact assembly 12 and the slip ring 32 are protected from road hazards such as flying gravel when the tire pressure monitor 10 is used to monitor the pressure in a tire of a road vehicle.

Figure 4:
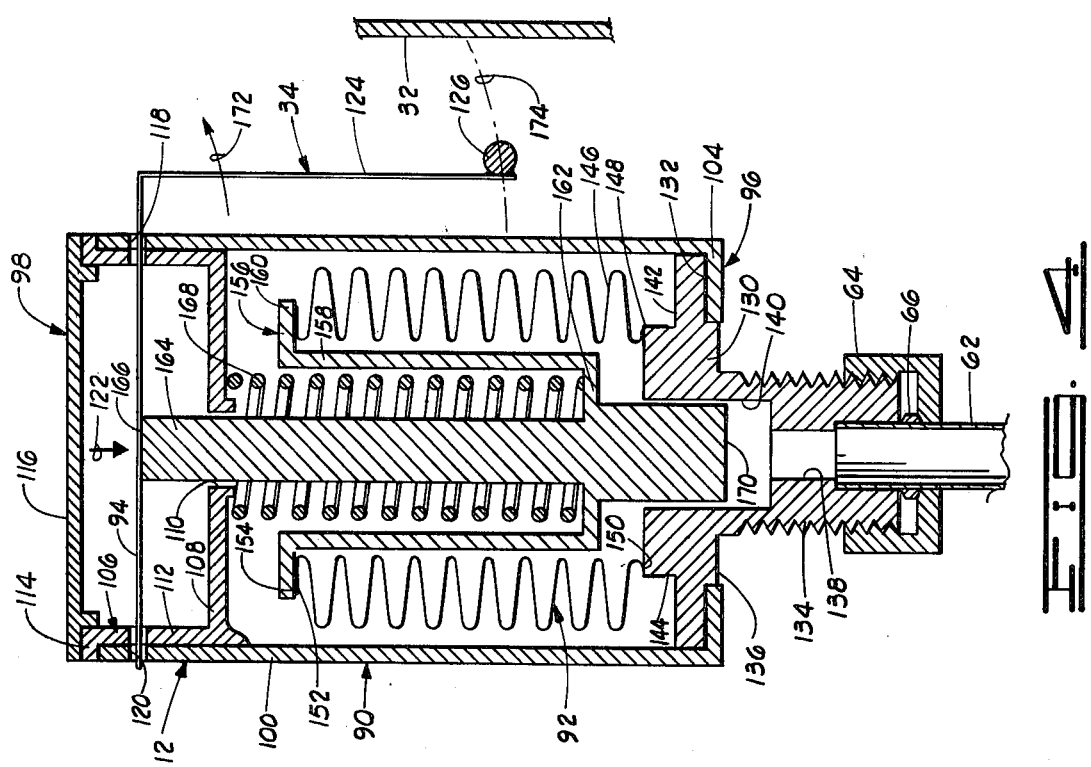
FIG. 4 is a cross section of the contact assembly of the tire pressure monitor for one tire pressure.
Figure 5:
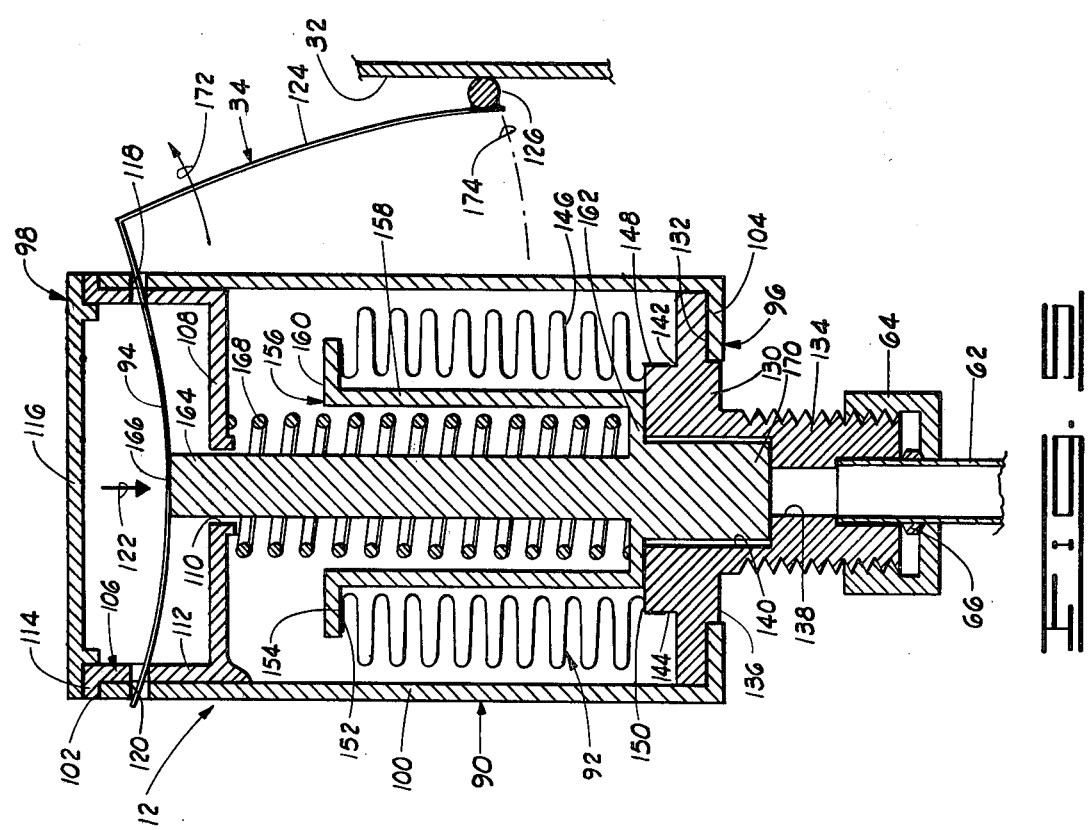
FIG. 5 is a cross section of the contact assembly for a different tire pressure.

In the application of the tire pressure monitor 10 illustrated in FIGS. 1, 2 and 3, an aperture 52 is formed through the brake drum 44 to provide access between the contact assembly 12 and the valve stem 24. The conduit assembly 22 in such case comprises a tubular feed through 54 which passes through the aperture 52 and the periphery of the feed through 54 is threaded such that the feed through 54 can be secured to the brake drum 44 via nuts 56 and 58. A length of tubing 60 is connected to the end of the feed through 54 disposed exteriorly to the brake drum 44 and extends therefrom to the lateral extension 26 on the valve stem 24. Similarly, a length of tubing 62 is connected to the end of the feed through 54 disposed within the brake drum 44 and extends therefrom to the contact assembly 12 so that the feed through 54 and the lengths of tubing 60, 62 transmit the air pressure in the tire to the contact assembly 12. Each end of each length of tubing 60, 62 is provided with a ferrule and the lengths of tubing 60, 62 are connected to the lateral extension 26 of the valve stem 24, the feed through 54 and the contact assembly 12 via nuts 64 which bear against the ferrules and force the ferrules against portions of the lateral extension 26, the feed through 54 and the contact assembly 12 to provide air tight connections between the lengths of tubing 60 and 62 and the lateral extension 26, the feed through 54 and the contact assembly 12 in the usual manner. (One of the ferrules, designated 66, is shown in FIGS. 4 and 5.)

The slip ring assembly 28 comprises an annular backing ring 68 which is constructed of an insulating material and the slip ring 32 is disposed on one face of the annular backing ring 68. The annular backing ring 68 has the form of a lamella and is provided with a first extension 70 and a second extension 72. The extensions 70, 72 are positioned substantially at opposite ends of a diameter of the backing ring 68 and are utilized for supporting the backing ring 68 on the non-rotating portion 30 of the vehicle (that is, on the backing plate for the brake drum 44 in the application shown in FIGS. 1, 2 and 3.) The slip ring 32 has a tab 74 disposed on a portion of the first extension 70 of the annular backing ring 68 and the lamp 38 is connected to the slip ring 32 via the tab 74 of the slip ring 32 as has been indicated in FIG. 3. The annular backing ring 68 and the slip ring 32 can be conveniently formed from a piece of copper-clad printed circuit board by cutting the circuit board to the shape of the annular backing ring 68, removing the copper cladding from the second extension 72 of the annular backing ring 68, and removing the copper cladding from a portion of the first extension 70 of the annular backing ring to leave the tab 74 on the first extension 70.

Apertures 76 and 78 are formed through the first and second extensions 70 and 72 and the slip ring assembly 28 further comprises a first adjustment screw 80 which passes through the aperture 76 of the first extension 70 of the annular backing ring 68 and a second adjustment screw 82 which passes through the aperture 78 in the second extension 72 of the annular backing ring 68. The shanks of the adjustment screws 80, 82 are threaded for substantially the entire length thereof and the adjustment screws 80, 82 are secured to the extensions 70, 72 via nuts 84 engaging both sides of the annular backing ring 68. The apertures 76 and 78 are positioned on the extensions 70 and 72 respectively such that the adjustment screws 80 and 82 and the nuts 84 are displaced from the slip ring 32 and the tab 74 thereof. (See FIG. 3) Thus the adjustment screws 80 and 82 are electrically isolated from the slip ring 32 such that portions of the adjustment screws 80 and 82 can contact electrically grounded portions of the vehicle and the adjustment screws 80 and 82 can be constructed of metal without grounding the lamp 38.

The non-rotating portion 30 of the vehicle is provided with threaded apertures 86 and 88 which received the adjustment screws 80 and 82 to support the slip ring assembly 28 on the vehicle employing the tire pressure monitor 10. The apertures 86 and 88 are positioned in substantially diametric opposition with respect to the axis 18 of the wheel 14 and are spaced a distance substantially equal to the spacing of the apertures 76 and 78 formed through the extensions 70 and 72 of the annular backing ring 68 of the slip ring assembly 28. Thus, the slip ring assemby 28 is supported on the non-rotating portion 30 of the vehicle such that the slip ring 28 and the annular backing ring 68 extend circumferentially about the axis 18 of the wheel 14. The mounting of the slip ring 32 via the annular backing ring 68 and the adjustment screws 80 and 82 permits the slip ring 32 to be axially positioned along the axis 18 of rotation of the wheel 14 for a purpose to be described below. Similarly, the slip ring 32 can be canted such that the slip ring 32 and the annular backing ring 68 will not be disposed perpendicularly to the axis 18 by extending unequal lengths of the shanks of the adjustment screws 80 and 82 through the non-rotating portion 30 of the vehicle. The purpose of canting the slip ring 32 with respect to the axis 18 will be discussed below. Locking nuts 87 on the adjustment screws 80, 82 secure the adjustment screws 80, 82 in the positions to which the adjustment screws 80, 82 are adjusted.

Referring now to FIGS. 4 and 5, shown therein is the contact assembly 12 of the tire pressure monitor 10. The contact assembly 12 comprises: a cylindrical housing, generally designated 90 in the drawings; a transducer assembly, generally designated 92; a flexure member 94 and the contact member 34.

The housing 90 has a first end 96 and a second end 98 and the housing 90 comprises a tubular wall member 100 extending from the first end 96 toward the second end 98 and terminating in a butt end 102 of the wall member 100 disposed near the second end 98 of the housing 90. An internal flange 104 is formed on the first end 96 of the wall member 100 for mounting the transducer assembly 92 within the wall member 100 as will be described below. The housing 90 further comprises a partition member 106 having a laminar circular partition plate 108 extending transversely across the wall member 100 of the housing 90 in a medial portion thereof. A central aperture 110 is formed through the partition plate 108 for a purpose to be described below. The partition member 106 has a tubular portion 112 extending from the partition plate 108 to the butt end 102 of the wall member 100 and the tubular portion 112 is sized to telescope within the wall member 100. A flange 114 formed on the end of the tubular portion 112 opposed to the partition plate 108 engages the butt end 102 of the wall member 100. In a preferred embodiment of the tire pressure monitor 10, the wall member 100 and the partition member 106 are formed of brass and the flange 114 is secured to the wall member 100 via soldering. A circular cap 116, similarly formed of brass in the preferred embodiment, is soldered to the flange 114 oppositely the butt end 102 of the wall member 100 and extends across the second end 98 of the housing 90.

Between the second end 98 of the housing 90 and the partition plate 108, a first aperture 118 and a second aperture 120 are formed through the housing 90. That is, the apertures 118 and 120 are formed through each of the tubular portion 112 of the partition member 106 and the wall member 100 of the housing 90. The apertures 118 and 120 are axially aligned on the housing 90 and are positioned at opposite ends of a diameter of the housing 90. In a preferred embodiment of the present invention, the apertures 118 and 120 have the shape of elongated slots with the long axes thereof disposed transversely to the axis of the housing 90 as has been illustrated for the aperture 118 in FIG. 2.

The flexure member 94 is loosely supported by the housing 90 via the apertures 118 and 120. In particular, the flexure member 94 extends through the apertures 118 and 120 and extends transversely across the interior of the housing 90. In the preferred embodiment, the flexure member 94 is constructed in the shape of an elongated lamellar strip and is formed of spring brass.

The contact member 34 is connected to one end of the flexure member 94 exteriorly of the housing 90 and extends from the flexure member 94 in a direction generally toward the first end 96 of the housing 90. That is, the direction in which the contact member 34 extends from the flexure member 94 has a component in a first transverse direction 122 of flexure for the flexure member 94, the first transverse direction extending substantially along the axis of the housing 90 toward the first end 96 of the housing 90. In a preferred embodiment of the tire pressure monitor 10, the contact member 34 comprises a first portion 124 having the form of an elongated lamellar strip and the first portion 124 of the contact member 34 is constructed unitarily with the flexure member 94. The contact member 34 further comprises a cylindrical, brass brush 126 soldered to the end of the first portion 124 opposite the end of the first portion 124 connected to the flexure member 94. The axis of the brush 126 is transverse to the axis of the first portion 124. As illustrated in FIG. 2, the contact assembly 12 is mounted on the wheel 14 such that the axis of the housing 90 is substantially tangent to the travel path 16 of the contact assembly 12 and the contact assembly 12 is oriented on the wheel 14 such that the contact member 34 faces the slip ring 32. The cylindrical form of the brush 126 and the above described mounting of the contact assembly 12 presents the curved surface of the brush 126 to the slip ring 32 such that the brush 126 can engage the slip ring 32 without binding for either direction of rotation of the wheel 14.

The transducer assembly 92 comprises a circular first seal 130 partially disposed within the tubular wall member 100 of the housing 90. The first seal 130 engages the flange 104 formed on the first end 96 of the housing 90 and is connected to the flange 104. In the preferred embodiment of the tire pressure monitor 10, the first seal 130 is formed of brass and is soldered to the face 132 of the flange 104 disposed in the interior of the housing 90.

A threaded cylindrical extension 134 is formed on a first face 136 of the first seal 130 at the first end 96 of the housing 90 and protrudes from the first end 96 of the housing 90. The axis of the extension 134 extends along the axis of the housing 90 and a circular port 138 is formed through the first seal 130 concentrically with the extension 134. The port 138 receives a portion of the length of tubing 62 of the conduit assembly 22 to communicate the air pressure in the tire to the port 138. An airtight seal is formed between the extension 134 and the length of tubing 62 in the manner previously described. The port 138 has an enlarged portion 140 which intersects a second face 142 of the first seal 130, the second face 142 being disposed within the housing 90 in a substantially transverse relation to the tubular wall member 100. The purpose of the enlarged portion 140 of the port 138 will be described below.

An annular shoulder 144 is formed on the second face 142 of the first seal 130 concentrically with the port 138 such that a central portion of the first seal 130 protrudes toward the second end 98 of the housing 90. A bellows 146, having a tubular flange 148 at one end 150 (referred to herein as a fixed end of the bellows 146) is connected to the first seal 130 and extends toward the second end 98 of the housing 90 concentrically with the axis of the housing 90. In the preferred embodiment, the bellows 146 is formed of brass, the flange 148 extends circumferentially about the shoulder 144 in engagement with the shoulder 144 and the flange 148 is soldered to the shoulder 144.

The bellows 146 has a flange 152 at a free end 154 of the bellows 146 and the flange 152 is soldered to a second seal 156 which, in the preferred embodiment, is constructed of brass. In particular, the second seal 156 has a tubular portion 158 having a flange 160 formed at one end thereof and the flange 160 is soldered to the flange 152 on the free end 154 of the bellows 146 with the tubular portion 158 of the second seal 156 extending from the free end 154 of the bellows 146 toward the fixed end 150 of the bellows 146 such that the tubular portion 158 of the second seal 156 is disposed within the bellows 146. The second seal 156 further comprises a circular base portion 162 at the end of the tubular portion 158 opposite the flange 160 such that the tubular portion 158 and the base portion 162 cooperate to seal the free end 154 of the bellows 146.

A push rod 164 is connected to the base portion 162 of the second seal 156 and extends therefrom to protrude through the aperture 110 formed in the partition plate 108 of the partition member 106 of the housing 90. The end 166 of the push rod 164 opposite the base portion 162 of the second seal 156 is connected to the flexure member 94 in a central portion of the flexure member 94. In the preferred embodiment of the tire pressure monitor 10, the push rod 164 is formed unitarily with the second seal 156 such that the push rod 164 is similarly constructed of brass and the push rod 164 is soldered to the flexure member 94.

A helical spring 168 is disposed about the push rod 164 with the major portion of the helical spring 168 being disposed within the tubular portion 158 of the second seal 156. The helical spring 168 engages the base portion 162 of the second seal 156 and engages portions of the partition plate 108 adjacent the aperture 110 formed through the partition plate 108 such that the helical spring 168 urges the second seal 156 toward the first seal 130. It will be noted that the positioning of the helical spring 168 within the tubular portion 158 of the second seal 156 provides a compact structure for the contact assembly 12.

A cylindrical stud 170 is connected to the base portion 162 of the second seal 156 oppositely the push rod 164 and the stud 170 extends into the enlarged portion 140 of the port 138 formed through the first seal 130 to provide a guide for axial movement of the push rod 164 in the housing 90. In the preferred embodiment of the tire pressure monitor 10, the stud 170 is formed unitarily with the second seal 156.

Operation of the Tire Pressure Monitor

Referring especially to FIGS. 4 and 5, the above recited construction of the contact assembly 12 results in a pivotation of the contact member 34 in a first pivotation direction 172, such that the brush 126 is displaced along an arcuate contact path 174, in response to a decrease in the air pressure in the tire as will now be described.

Initially, it is noted that the flexure member 94 is supported by the apertures 118 and 120 formed in the housing 90 such that a displacement of the medial portion of the flexure member 94 to which the push rod 164 is attached will flex the flexure member 94 such that the flexure member will have a bowed configuration such as the configuration shown in FIG. 5. Since the flexure member 94 is not clamped by the apertures 118 and 120, flexing of the flexure member 94 will reorient portions of the flexure member 94 near the end thereof to which the contact member 34 is attached. The reorientation of the flexure member 94 will, in turn, pivot the contact member 34 about the first aperture 118 such that the contact member 34 is pivoted with respect to the wheel 14. In particular, when the medial portion of the flexure member 94 is displaced in the first transverse direction 122, the contact member 34 is pivoted away from the housing 90 in the first pivotation direction 172 as shown in FIG. 5.

Air pressure transmitted to the interior of the bellows 146 via the conduit assembly 22 exerts a force on the second seal 156 of the transducer assembly 92 to urge the second seal 156 in a direction opposed to the first transverse direction 122 of the flexure member 94. Conversely, the helical spring 168 exerts a force on the second seal 156 to urge the second seal 156 in the first transverse direction 122 such that the air pressure in the tire and the helical spring 168 coact to axially position the push rod 164 in the housing 90. In the event the air pressure in the tire decreases, the force in the direction opposed to the first transverse direction 122 decreases so that the helical spring 168 displaces the second seal 156 in the first transverse direction 122 of the flexure member 94. Accordingly, the medial portion of the flexure member 94 is displaced in the first transverse direction 122 to pivot the contact member 34 in the first pivotation direction 172.

Referring now to FIG. 1, the contact assembly 12 is positioned on the wheel 14 such that the contact member 34 is in a facing relation with the slip ring 32 and spaced a distance therefrom. In particular, the slip ring 32 is positioned to intersect the arcuate contact path 174 of the brush 126 as has been illustrated in FIGS. 4 and 5. Thus, a pivotation of the contact member 34 in the first pivotation direction 172 results in engagement of the slip ring 32 by the contact member 34 to ground the terminal of the lamp 38 connected to the slip ring 32. Accordingly, the lamp 38, connected to the battery 40 as previously described, will be energized in the event the tire pressure decreases sufficiently for the contact member 34 to engage the slip ring 32, whereby the operator of the vehicle is informed of the decrease in tire pressure by the illumination of the lamp 38.

The mounting of the slip ring 32 via the backing ring 68 and the adjustment screws 80 and 82 permits the tire pressure monitor 10 to be adjusted for a range of tire pressures for which the lamp 38 will be illuminated. In particular, should it be desired to decrease the tire pressure for which the lamp 38 is illuminated, the locking nuts 87 locking the adjustment screws 80 and 82 in position on the non-rotating portion 30 of the vehicle and the nuts 84 securing the adjustment screws 80 and 82 to the backing ring 68 are loosened and the adjustment screws 80 and 82 are turned to increase the spacing between the housing 90 of the contact assembly 12 and the slip ring 32. The nuts 84 and 87 are then tightened to fix the slip ring 32 in the new position.

The capability for canting the slip ring 32 with respect to the axis 18 of rotation of the wheel 14 is particularly useful where the tire pressure monitor 10 is used with a road vehicle such that the operator of the vehicle would desire notification of a decrease in tire pressure during such time that the wheel 14 is rolling along a roadway. The canting of the slip ring 32 results in different portions of the slip ring 32 intersecting the contact path 174 at different points of the contact path 174 as the wheel 14 rotates. Accordingly, in the event the tire develops a leak so that the tire pressure decreases with time, contact between the contact member 34 and the slip ring 32 will initially occur for only a small portion of a period of rotation of the wheel 14. As the tire continues to lose pressure, the portion of the time period of rotation of the wheel for which the contact member 34 engages the slip ring 32 increases. Thus, the quality of illumination of the lamp 38 varies with time as the tire pressure decreases. Initially, the lamp 38 provides flashes of light having short duration. As the decrease in air pressure continues, the duration of the flashes continues until the lamp 38 provides continuous illumination. The time period between the initial flash and the continuous illumination provides the operator of the vehicle with a qualitative measure of the rate at which the time pressure is decreasing so that the operator can take action appropriate to the rate of decrease. Thus, for example, if the vehicle travels a distance of several miles between the initial flash and the continuous illumination of the lamp, the operator of the vehicle might decide to delay changing the leaking tire until the vehicle reaches a service station or the like. If the vehicle travels only a short distance between the initial flash and the continuous illumination, the operator of the vehicle is informed that the leaking tire must be changed before he proceeds to a service station or the like.

It is clear that the present invention is well adapted to carry out the objects and attain the ends and advantages mentioned as well as those inherent therein. While a presently preferred embodiment of the invention has been described for purposes of the disclosure, numerous changes may be made which will readily suggest themselves to those skilled in the art and which are encompassed within the spirit of the invention disclosed and as defined in the appended claims.

What is claimed is:

1. A tire pressure monitor for detecting a loss of air pressure in a pneumatic tire of a wheel of a vehicle, comprising:
    a contact assembly mounted on the wheel for movement along a circular travel path during rotation of the wheel about the axis of the wheel, the contact assembly comprising:
        a flexure member formed of a flexible material;
        support means for supporting the flexure member for flexing in response to a displacement of a medial portion of the flexure member;
        pressure transducer means, connected to the medial portion of the flexure member, for displacing the medial portion of the flexure member in a first transverse direction in response to a decrease in the air pressure in the tire, the pressure transducer means comprising:
            a first seal mounted on the support means and displaced in the first transverse direction from the flexure member, the first seal having a port formed therethrough;
            a bellows having a fixed end sealed to the first seal about the port and a free end displaced from the fixed end toward the flexure member;
            a second seal mounted on the free end of the bellows and sealing the free end of the bellows;
            conduit means for communicating air pressure in the tire to the port in the first seal, whereby air pressure in the tire is communicated to the interior of the bellows for urging the second seal in a direction opposed to the first transverse direction;
            biasing means for urging the second seal in the first transverse direction; and
            a push rod mounted on the second seal and connected to the flexure member; and
        a contact member connected to the flexure member so as to pivot with respect to the wheel in response to flexing of the flexure member, the contact member pivoting in a first pivotation direction in response to a displacement of the medial portion of the flexure member in the first transverse direction, whereby a portion of the contact member is displaced along an arcuate contact path in response to a decrease in the air pressure in the tire;
    slip ring means, intersecting the contact path, for engaging the contact member at a preselected pivotation of the contact member in the first pivotation direction; and
    signal means for providing a signal in response to the engagement of the contact member and the slip ring means.

2. The tire pressure monitor of claim 1 wherein the support means comprises:
    a tubular housing having a first end and a second end, the first seal connected to the first end of the housing; and
    a partition plate extending transversely across the housing between the second seal and the flexure member, the partition having an aperture formed therethrough and the push rod extending through the aperture; and
wherein the biasing means comprises a helical spring extending circumferentially about the push rod and engaging the partition plate and the second seal.

3. The tire pressure monitor of claim 2 wherein the second seal comprises a tubular portion having a flange formed on one end thereof and having a base portion extending across the other end thereof; wherein the free end of the bellows is sealingly connected to the flange so as to position the tubular portion and the base portion of the second seal within the bellows; and wherein the push rod is mounted on the base portion of the second seal.

4. The tire pressure monitor of claim 3 wherein the port through the first seal is characterized as being circular and wherein the pressure transducer means further comprises a cylindrical stud connected to the base portion of the second seal and extending into the port formed through the first seal.

5. The tire pressure monitor of claim 2 wherein the housing is characterized as having a first aperture and a second aperture, the apertures disposed at opposite ends of a diameter of the housing near the second end of the housing; wherein the flexure member extends through the first aperture and the second aperture such that the apertures engage the flexure member for supporting the flexure member for flexing; and wherein the contact member is connected to the flexure member at one end of the flexure member exteriorly of the housing.

6. The tire pressure monitor of claim 5 wherein the first and second apertures have the form of elongated slots with the long axis thereof transverse to the first transverse direction of flexing of the flexure member and wherein the flexure member is characterized as having the form of an elongated lamellar strip.

7. The tire pressure monitor of claim 6 wherein the contact member comprises an elongated lamellar portion formed unitarily with the flexure member.

8. The tire pressure monitor of claim 7 wherein the slip ring means comprises a lamellar, annular strip ring disposed about the axis of rotation of the wheel and constructed of a conducting material.

9. The tire pressure monitor of claim 8 wherein the signal means comprises a lamp having one terminal connected to the slip ring and one terminal connected to one pole of a battery and wherein the contact slip is electrically connected to the other pole of the battery.

10. The tire pressure monitor of claim 8 or claim 9 wherein the slip ring is characterized as being canted with respect to the axis of rotation of the wheel.

11. The tire pressure monitor of claim 8 wherein the slip ring means further comprises:
an annular backing ring formed of an insulating material and supporting the slip ring about the axis of rotation of the wheel;
a first adjustment screw supported by a non-rotating portion of the vehicle; and
a second adjustment screw supported by the non-rotating portion of the vehicle, the first and second adjustment screws connected to the backing ring at opposite ends of a diameter thereof.

12. The tire pressure monitor of claim 8 wherein the tubular housing of the contact assembly is disposed substantially tangentially to the travel path along which the contact assembly moves during rotation of the wheel; wherein the contact member extends from the flexure member in a direction having a component in the first transverse direction of the flexure member; and wherein the contact member comprises a cylindrical brush disposed on the end of the lamellar portion of the contact member opposed to the end of the lamellar portion of the contact member connected to the flexure member, the brush extending transversely along the lamellar portion of the contact member.

* * * * *